United States Patent Office 2,918,099
Patented Dec. 22, 1959

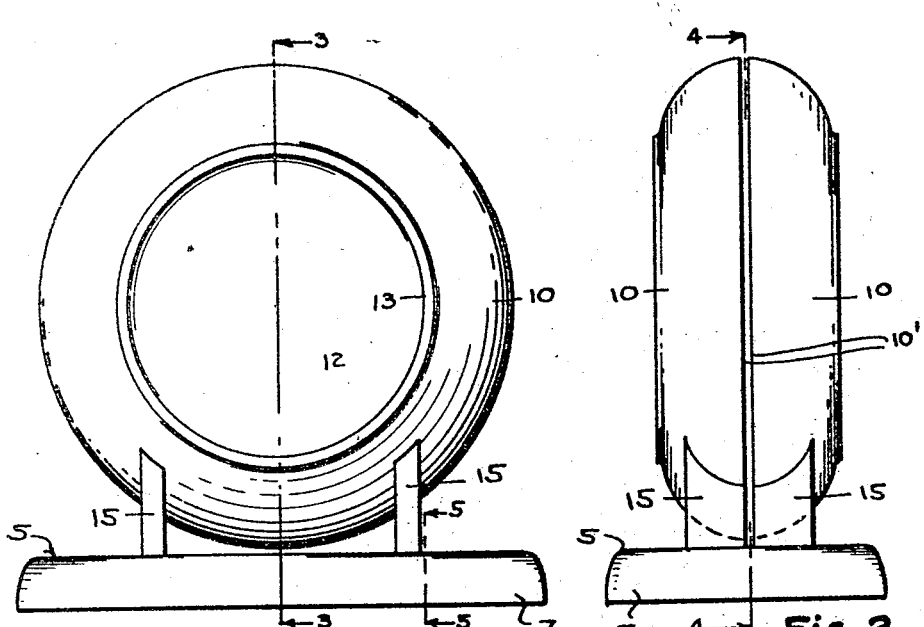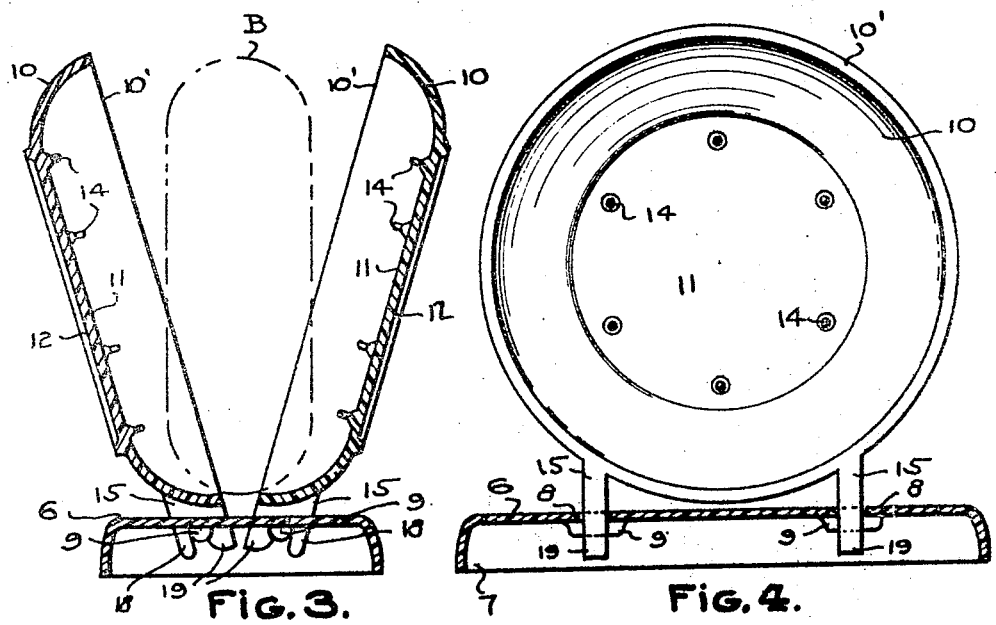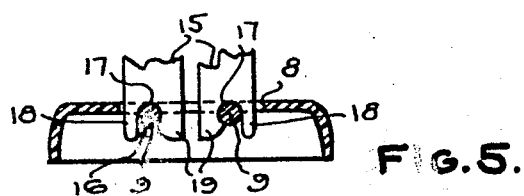

2,918,099

HOLDING AND SLICING GUIDE FOR EDIBLE FOOD PRODUCTS

Charles E. Goldstein, North Miami Beach, Fla., assignor to Plastics, Inc., Miami, Fla., a corporation of Florida Application June 25, 1958, Serial No. 744,412

4 Claims. (Cl. 146—150)

This invention relates to an improvement in slicing guides and has particular reference to a slicing guide formed in a pair of opposed shell sections between which an article to be sliced is securely held and with the shell sections being slightly spaced to form a guide for a cutting knife.

Edible food articles, such as the well known "bagel" are extremely difficult to slice, especially when they have become hardened from exposure to the air and it frequently happens that the operator cuts his fingers or otherwise injures his hand in attempting to hold the bagel while cutting the same for purposes of toasting or the like. The device of the present invention contemplates a novel holder for donut like food products, such as the "bagel" and whereby the side walls of the bagel are securely gripped between the pair of opposed shell sections, whereby the bagel, or the like is securely held against any tendency to rotate under the influence of the cutting action of the knife.

The invention further contemplates a novel form of guide for slicing food products that is formed in molded sections to be assembled with respect to a base without the use of separate fastening devices and whereby shell sections are pivotally or hingedly supported with respect to the base so that they may swing toward and from each other and with the structure being such that the parts can be readily disassembled with a minimum of effort and with the device constituting a sanitary cutting guide that may be formed at a relatively low cost.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

In the drawings:

Figure 1 is a side elevation of a cutting guide constructed in accordance with the invention, Figure 2 is an edge view thereof, Figure 3 is a vertical section taken substantially on line 3—3 of Figure 1, and with the parts being shifted to an open position to receive an article to be sliced, Figure 4 is a longitudinal vertical section through a supporting base member and with one half of the device being shown in elevation and, Figure 5 is a fragmentary transverse section taken substantially on line 5—5 of Figure 1.

Referring specifically to the drawings, the numeral 5 designates a preferably molded plastic base of inverted pan-shape. The base is generally rectangular and embodies an upper flat wall 6 and marginal side and end walls 7. The top 6 of the base is slotted transversely at spaced apart points as at 8. The slots 8 are spanned by cylindrical hinge pins 9, preferably molded integral with the base. The pins 9 are in spaced apart relation to each other. The base may be perforated if desired for the passage of screw fasteners, should it be desired that the device be securely anchored upon a cutting board or the like.

Hingedly supported upon the base 6 to swing in opposed relation to each other, is a pair of hollow shells 10, having flat bottoms 11, the outer faces of each shell 10 having a correspondingly flat surface 12, defined by a circular concentric rib 13. The inner surface of the flat bottom 11 is provided with a plurality of inwardly projecting pins 14, and with the pins being arranged in a circular form and preferably in equidistantly spaced relation. The shells 10 and the pins 14 are molded or otherwise formed integrally and preferably from plastic of any desirable character. Each shell 10 is provided with a pair of spaced apart legs 15, also formed integral with the shells. Each leg 15 is slotted at its lower end at 16 and shaped to form a semi-cylindrical socket 17. The socket 17 is formed by an outer tongue 18 and an inner tongue 19 and with the tongue 19 being arcuately formed to constitute a guide to facilitate the engagement of the legs 15 with the hinge pins 9. The tongues 18 are calculated to have a sufficient degree of flexibility that permits the legs 15 to be forcibly engaged downwardly for seating the hinge pins 9 into the slots 16 and the socket 17. Also, the shell sections may be readily disassembled with respect to the base by exerting sufficient upward force upon the shells, while holding the base firmly.

In assembling the device, the legs of each shell are engaged downwardly through the slots 8 to engage the slots 16 of the legs into contact with its respective hinge pins 9 then, by forcing downwardly upon the particular shell, the legs are forced into snapping engagement with the pins 9, forming a hinge connection between the shells 10 and the base 5. The length of the slots 8 will obviously determine the degree of angularity or hinging movement of the shells 10 with respect to the base 5. In use, the operator separates the shells 10, as in Figure 3 and then inserts a bagel, indicated by dotted line in Figure 3 at "B," with the bagel or other donut-like food product resting upon the lower wall of the shells 10. The shells 10 are then swung inwardly, causing the pins 14 to bite into the side walls of the bagel and firmly hold the bagel against any tendency to rotate. A cutting knife is then engaged downwardly between the joint formed by the abutting edges of the shells 10, and with the abutting edges 10' constituting a guiding slot for a cutting implement, such as a carving knife and, with the knife started at the top in engagement with the bagel to be cut, the operator merely reaches over the top of the device and simultaneously holds the two shells 10 firmly against the bagel until the knife has traversed the entire guide or until its blade has engaged the top surface 6 of the base 5 in which position, the food product will have been entirely separated into two substantially equal sections that facilitate the insertion of the sections into a conventional toaster.

It will be apparent from the foregoing that a very novel form of cutting guide has been provided for ring-like or donut-shaped articles. The device securely holds the article and protects the hands of the user at all times during the cutting action. The entire device is economically formed and is quickly and easily assembled without the use of separate fastening devices, is strong, durable and most effective for the purposes indicated.

It is to be understood that the invention is not limited to the precise construction shown, but that changes are contemplated as readily fall within the spirit of the invention as shall be determined by the scope of the subjoined claims.

Having described my invention, what I claim as new and desire to secure by Letters Patent is:

1. A holding and slicing guide for food articles that have a generally donut shape, comprising a hollow base having two pairs of hinge pins formed thereon, a pair of shells having open sides and with the open sides being in opposed relation, hinge devices carried by each shell and that detachably engage the hinge pins whereby the shells may swing toward and from each other, the hinge devices at their lower ends having yieldable means that engage the hinge pins, the shells when swung together forming a hollow housing for supporting the food article to be sliced, gripping means carried by each shell that bites into the side walls of the food article, the opposed edges of the shells being slightly spaced apart to form a knife guide.

2. The device according to claim 1, wherein each shell and its hinge devices are formed integral, the said base and its hinge pins being also formed integral, the hinge devices of the shells having a snapping engagement with the hinge pins at assembly of the device.

3. The device according to claim 1, wherein each shell is provided with a pair of supporting legs, the lower ends of the legs being slotted and shaped to form a semi-cylindrical socket that engages the hinge pins for rotative movement thereon, the slotted ends of the legs being flexible to engage over the hinge pins in snapping relation, the said base provided upon its top with a pair of parallel spaced apart slots, each slot being bisected by a pair of spaced apart and parallel cylindrical hinge pins, the spacing of the slots being identical to the spacing of the hinge devices whereby the lower ends of the hinge devices may be inserted through the slots to engage the hinge pins.

4. The device as in claim 1, wherein the gripipng means for the food article comprises a plurality of inwardly projecting pins formed on an inner flat wall of each shell, the pins being arranged in a circle and equidistantly spaced apart, the said pins being disposed radially from the axial center of the shells whereby they will grip upon the side walls of the food article when the shells are moved together.

References Cited in the file of this patent

UNITED STATES PATENTS

| | | |
|---|---|---|
| 1,764,235 | Wilmking | June 17, 1930 |
| 2,206,154 | Bixler | July 2, 1940 |
| 2,553,700 | Brooker | May 22, 1951 |